April 25, 1967 D. R. EGLES 3,315,789
CONVEYER
Filed May 26, 1965 3 Sheets-Sheet 1

INVENTOR.
Douglas R. Egles
BY
Robert R. Churchill
ATTORNEY

April 25, 1967  D. R. EGLES  3,315,789
CONVEYER

Filed May 26, 1965  3 Sheets-Sheet 2

INVENTOR.
Douglas R. Egles
BY Robert P. Churchill
ATTORNEY

United States Patent Office 3,315,789
Patented Apr. 25, 1967

3,315,789
CONVEYER
Douglas R. Egles, Holbrook, Mass., assignor to Pneumatic Scale Corporation, Limited, Quincy, Mass., a corporation of Massachusetts
Filed May 26, 1965, Ser. No. 458,897
9 Claims. (Cl. 198—165)

This invention relates to a conveyer.

The invention has for an object to provide a novel and improved conveyer of the type having a pair of endless resilient elements mounted to grip and convey therebetween articles, such as containers, in a smooth and gentle manner, the improvement comprising a novel structure of conveying element adapted to automatically conform to various shapes and sizes of containers.

The invention has for a further object to provide a novel and improved conveyer of the character specified embodying a non-inflatable resilient conveying element having greatly increased wearing characteristics and which is not subject to the stresses inherent in the inflatable conveying elements formerly used.

With these general objects in view and such others as may hereinafter appear, the invention consists in the conveyer as hereinafter described and particularly defined in the claims at the end of this specification.

In the drawings illustrating the preferred embodiment of the invention:

Figure 1:
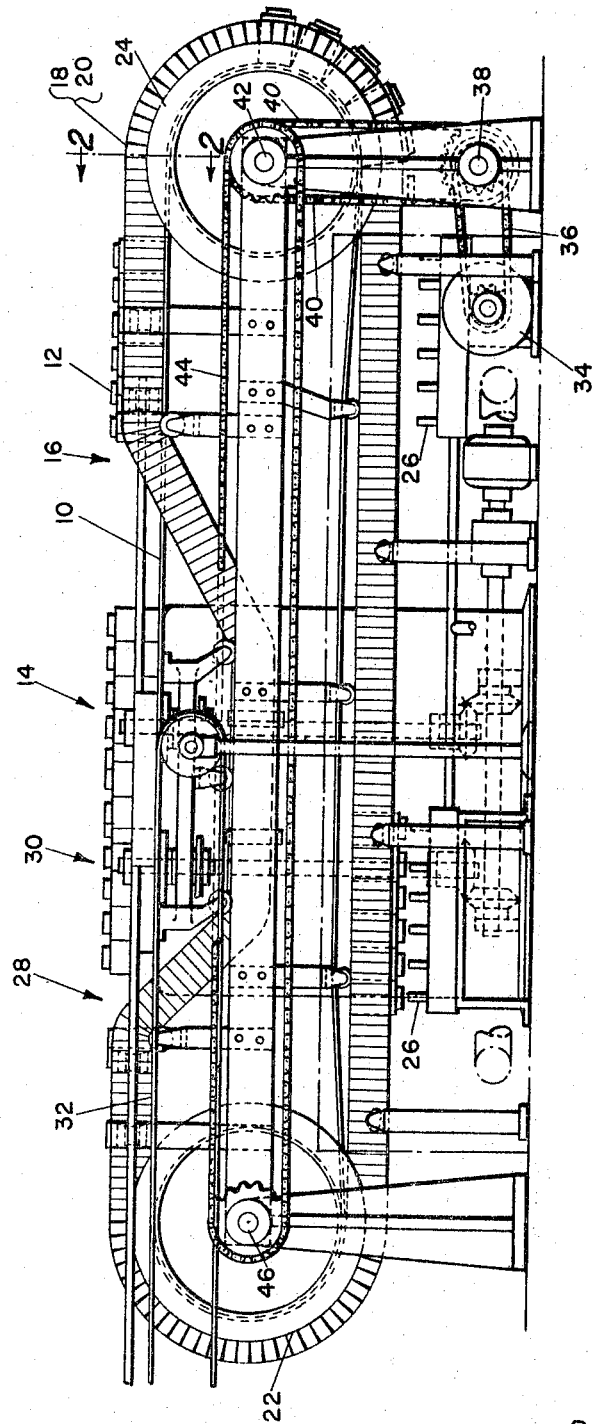
FIG. 1 is a side elevation of a conveyer embodying the present invention.

In general, the present invention comprises an improvement in a conveyer of the type illustrated and described in the United States patent to Whelan, No. 2,879,882, issued Mar. 31, 1959, and to which reference may be made for a complete description of the structure and mode of operation of such conveyer. In such prior conveyer the conveying elements comprise a pair of endless air inflated rubber tubes mounted to run side by side in spaced relation and having an upper run and a lower run. Provision is made in the prior conveyer for diverting the tubes laterally outwardly along the upper run thereof to form a converging portion at each end of the conveyer for the reception of articles at one end and for the release of articles at the other end. The articles, such as containers, are initially supported on an intermediate belt which carries the containers into a position to be gripped between the converging portions of the conveying elements at one end, and onto which the containers are released at the other end to be discharged from the conveyer. Provision is also made in the prior conveyer for transferring containers from a supply thereof onto the intermediate supporting belt and for transferring the released containers onto a discharge conveyer. In order to permit lateral transfer of the containers to and from the intermediate supporting belt, provision is also made for diverting the inflated tubes downwardly out of the plane of transfer to and from the intermediate belt.

While such prior conveyer has been commercially successful there are several disadvantages inherent in the use of air inflated tubes. One disadvantage lies in the possibility of rupturing or puncturing the air inflated tube such as to cause a blowout and requiring repair or replacement of the tube. Another difficulty inherent in such tubes is that they are subject to twisting stresses during their passage over the pulleys and guide rollers for diverting the tubes laterally and downwardly. It will be observed that in passing over the pulleys and the guide rollers, the inner periphery of the tube has to be contracted while the outer periphery has to be stretched, thus producing a strain on those portions of the tubes passing over the same.

In accordance with the present invention, the conveying element comprises a resilient, endless, non-inflatable element, cylindrical in cross section, made up of a plurality of resilient sections or annular disks mounted on a central flexible and non-stretchable core member. In practice, the resilient disks are compressed together on the central core to form, in effect, a solid resilient tube. One advantage of the present structure is that it is punctureproof. Also, as it passes around the various bends of the pulleys and deflecting rollers, the resilient disks are individually compressed adjacent the inner periphery of the tube and are permitted to expand and separate adjacent the outer periphery of the tube, thus relieving the normal stress occurring when passing around the guiding and driving members. Also, any twisting strain imparted to the conveying element is imparted to the individual disks without influencing the remainder of the endless conveying element, thus localizing the strain which is immediately neutralized after passing the deflecting rollers.

Referring now to the drawings and particularly to FIG. 1, the present conveyer is illustrated as embodied in a container cleaning machine, only a sufficient portion of such machine being herein shown so as to enable the invention to be understood. The construction and mode of operation of such machine, except as hereinafter pointed out, may comprise that disclosed in the patent to Whelan, No. 2,879,882, to which reference may be made for a complete description of such machine. It is believed sufficient to state that, in general, the illustrated conveyor comprises a continuously moving central or intermediate supporting belt 10 to which containers 12 are delivered from a supply thereof by rotary transfer means indicated generally at 14. In operation, the containers are moved along the supporting belt 10 into a converging portion 16 of a pair of endless resilient conveying elements 18, 20 arranged to resiliently grip and convey the containers therebetween. The endless resilient conveying elements 18, 20 are guided in spaced relation over end pulleys 22, 24 providing an upper and a lower run, and in operation, the containers gripped between the resilient conveying elements along the upper run in an upright position are carried around the pulley 24 to assume an inverted position along the lower run of the conveyer. While being conveyed in an inverted position the containers may be subjected to cleaning, washing or other operations which may be conveniently performed while the containers are inverted by any usual or preferred form of mechanism, such as the nozzles 26 mounted to direct streams of air upwardly into the inverted open mouth containers as the latter are being conveyed along the lower run of the conveyer as shown. Thereafter, the containers are carried around the end pulley 22 and back onto the upper run where they are released at a diverging portion 28 of the resilient conveying elements 18, 20 onto the central belt 10. The containers may then be guided into rotary transfer means indicated generally at 30 which transfer the containers onto a discharge conveyer 32. As illustrated, suitable guide rolls are provided for directing the resilient tubes both laterally outwardly and vertically downwardly along the upper run of the conveyer whereby to provide the converging and diverging portions and also to divert the tubes out of the path of the containers being transferred to and from the intermediate supporting belt 10.

As shown in FIG. 1, the pulleys 22, 24 may be driven by mechanism including an electric motor 34 which may be connected by a chain and sprocket drive 36 to an intermediate shaft 38. The intermediate shaft 38 is connected by a chain and sprocket drive 40 to the pulley shaft 42 on which the pulley 24 is mounted. A chain and sprocket drive connection 44 is provided between the pulley shafts 42 and 46 as shown.

Figure 2:
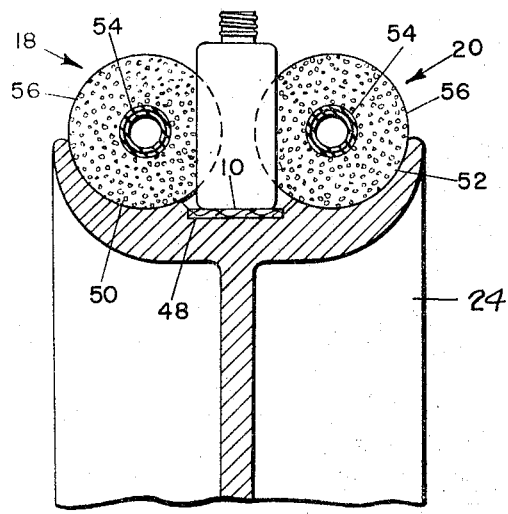
FIG. 2 is a cross sectional view taken on the line 2—2 of FIG. 1.

As illustrated in FIG. 2, each pulley 22, 24 is provided with an intermediate or central portion 48 having a flat cylindrical surface for accommodating the intermediate belt 10 on which the containers are supported and advanced into and out of engagement with the resilient conveying elements 18, 20. Each pulley is further provided with concave cylindrical surfaces 50, 52 on each side of and a short distance above the flat surface 48 and which conforms to the shape of the cylindrical conveying elements 18, 20.

Figure 3:
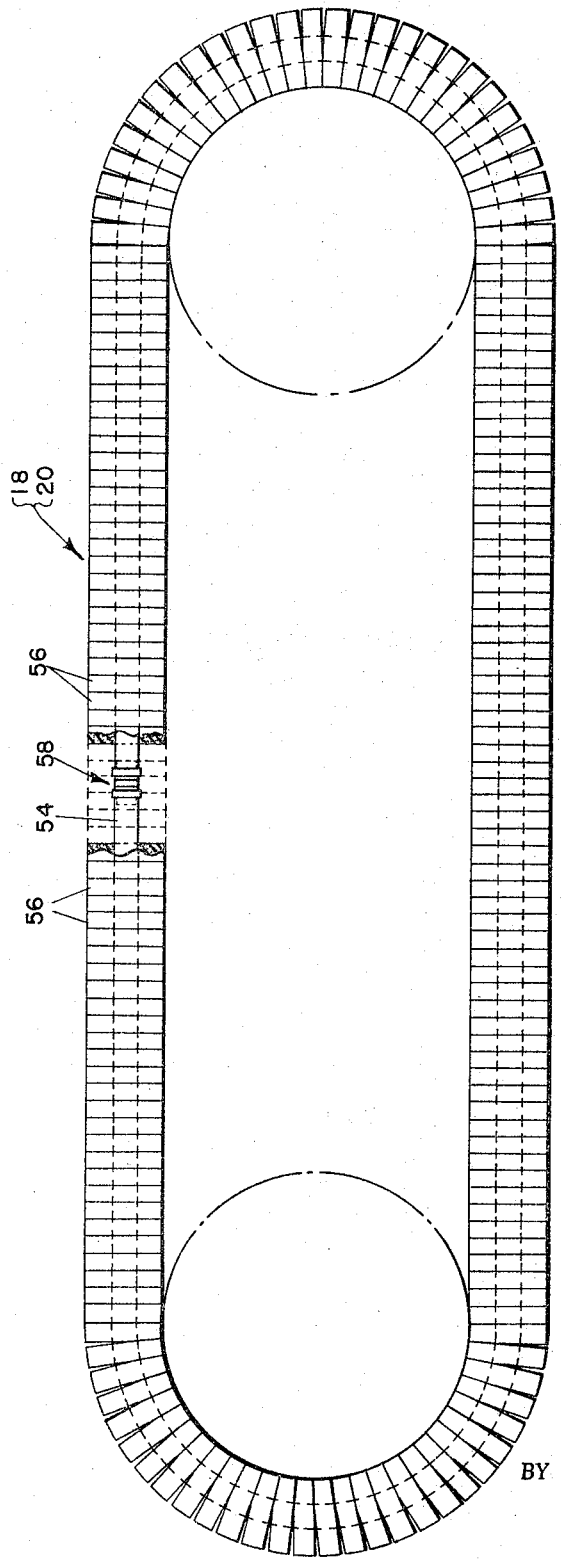
FIG. 3 is a detail view of one of the endless conveying elements.

Referring now to FIG. 3, in accordance with the present invention, each resilient conveying element 18, 20 comprises a central hollow flexible core member 54 having a plurality of individual resilient annular members or disks 56 mounted thereon. The illustrated core member 54 comprises a rubber and fabric hose material which is flexible but non-stretchable. In practice, the annular disks 56 are mounted and compressed on the core member 54 after which the ends of the core member are joined together by a connection indicated generally at 58.

Figure 6:
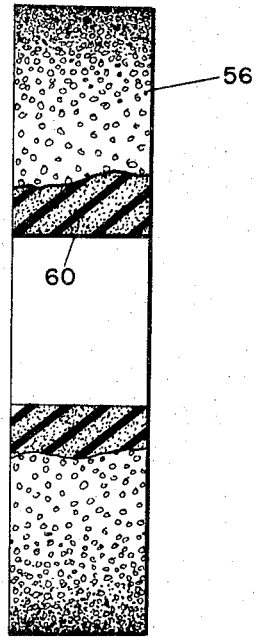
FIG. 6 is a detail view of one of the annular resilient disks used in producing the present conveying element.

The annular resilient disks 56 comprise a relatively tough spongy material, such as urethane and rubber, and in practice, the inside diameter of the annular disks are made smaller than the outside diameter of the core member 54 so that the disks are stretched onto the core member in frictional and resilient engagement therewith. As an example of the proportions of the parts, in the illustrated embodiment of the invention, the outside diameter of the core member 54 is one and one-half inches, and the inside diameter of the annular disk 54 is one and one-quarter inches as shown in FIG. 6. The outside diameter of each disk is about four and five-eighths of an inch, and the disk is about one inch in thickness.

Figure 4:
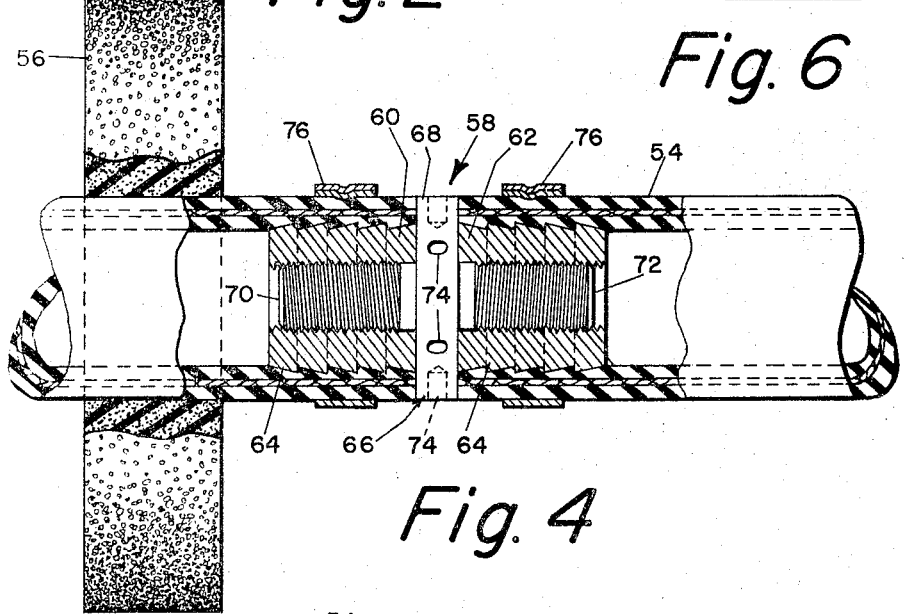
FIG. 4 is an enlarged cross sectional view of a connecting joint shown in FIG. 3.
Figure 5:
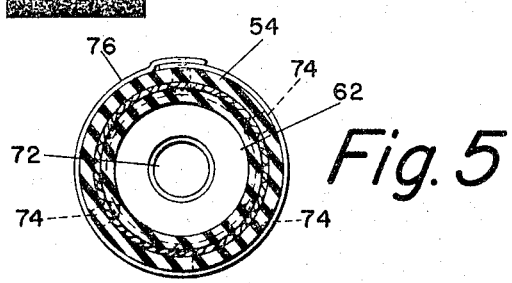
FIG. 5 is a cross sectional end view of the joint shown in FIG. 4.

As illustrated in detail in FIG. 4, the connection indicated generally at 58 includes a pair of internally threaded adapters 60, 62 having a right hand thread and a left hand thread, respectively, and which are inserted into the ends of the hollow core member 54 as shown. The outside diameter of each adapter is serrated in a manner such as to form a plurality of adjacent frustums or conical sections 64 which may be easily forced into the ends of the hollow core member but which resist removal of the adapter. The connection further includes a threaded coupler 66 having a central shoulder or collar portion 68, a right hand threaded portion 70 extending from one side of the collar and a left hand threaded portion 72 extending from the other side of the collar as shown. The collar portion 68 is provided with a plurality of spaced radial openings 74 for reception of a spanner wrench.

In assembling the resilient non-inflatable conveying elements or tubes, the adapters 60, 62 are first inserted into the ends of the hollow flexible core member 52. In order to retain the adapters in their assembled position, clamping bands 76 are applied around the ends of the core member in the area of the adapters as shown. The clamping bands are tightly secured and may be of the type capable of being locked into position. The annular resilient disks 56 are then mounted on the core member 52 and compressed into contiguous engagement. When the core member is filled with the annular disks, those disks adjacent the ends of the core member may be squeezed back to permit the coupler 66 to be placed between the ends of the core member. The threaded portions 70, 72 are then engaged with the threaded adapters 60, 62 whereupon the coupler 66 is rotated by means of a spanner wrench to draw the ends of the core member together by virtue of the right hand and left hand threaded portions. Thereafter, the squeezed back resilient disks 56 adjacent the ends of the core member are released to fill up the space occupied by the collar portion 68.

From the above description it will be seen that when the present non-inflatable resilient conveying elements 18, 20 are embodied in a conveyer, as illustrated in FIG. 1, the containers may be firmly gripped and conveyed therebetween in a safe and efficient manner without undue strain or wear of the elements during their passage around the end pulleys and over the guide rolls for deflecting the conveying elements outwardly and downwardly as described. In passing around the end pulleys it will be seen that the inner periphery of the conveying elements can contract by virtue of the individual resilient disks 56 without undue stress and that the outer periphery may expand by separation of the individual disks, thus entirely eliminating any strain in the disks along the outer periphery. As a result, the present non-inflatable conveying elements are capable of long use without undue wear. Another advantage of the present structure of conveying element resides in the feature of being able to replace individual disks or sections of the conveyer which may become worn instead of replacing the entire conveying element. It will also be seen that any twisting strain imparted to the conveying element is absorbed by the individual disks without influencing the remainder of the endless resilient conveying element.

While the preferred embodiment of the invention has been herein illustrated and described, it will be understood that the invention may be embodied in other forms within the scope of the following claims.

Having thus described the invention, what is claimed is:

1. In a conveyer of the character described, in combination, a pair of end pulleys, a pair of endless resilient conveying elements arranged in spaced relation on said pulleys to grip and convey containers therebetween, said conveyer having an upper and a lower run, an intermediate container supporting belt, means including guide rollers for diverting portions of the upper run outwardly and downwardly to provide clearance for receiving and discharging containers, each of said conveying elements comprising a central flexible core member, and a plurality of individual annular resilient sections mounted on said core member, said individual resilient sections being capable of absorbing any twisting strains during passage of the conveying elements over said diverting rollers without influencing the remainder of the conveying elements.

2. A conveyer as defined in claim 1 wherein the central core member initially comprises an extended length of material, and means for connecting the ends of the core member after assembly of said individual sections onto the extended length of material.

3. A conveyer as defined in claim 1 wherein the annular resilient sections comprise a tough sponge-like material.

4. A conveyer as defined in claim 1 wherein said resilient sections are relatively narrow and are mounted to contiguous engagement and in compressed relation on said core member.

5. A conveyer as defined in claim 1 wherein the core member comprises a substantially non-stretchable material.

6. A conveyer as defined in claim 1 wherein the inside diameter of each of said annular resilient sections is smaller than the outside diameter of said core member whereby each section is resiliently and frictionally engaged with said core member.

7. A conveyer as defined in claim 1 wherein the core member comprises an extended length of hollow flexible and non-stretchable material, and means connecting the ends of said core member comprising threaded adapters inserted into and secured to the ends of the hollow core member, and a threaded coupler for engagement with said adapters.

8. A conveyer as defined in claim 1 wherein the individual resilient sections are relatively narrow to permit contraction of the sections at the inner periphery of said conveying elements as they pass around the end pulleys, and to permit separation of the sections at the outer periphery of the conveying elements as they pass around said pulleys.

9. In a conveyer of the character described, comprising a pair of resilient conveying elements mounted to grip and convey articles therebetween, each conveying element comprising an extended length of a flexible and substantially non-stretchable material connected at its ends to define an endless core member, and a plurality of relatively narrow annular resilient sections frictionally and compressibly mounted in contiguous engagement on said core member.

References Cited by the Examiner
UNITED STATES PATENTS

| | | | |
|---|---|---|---|
| 2,297,295 | 9/1942 | Flintjer | 198—162 |
| 2,595,941 | 5/1952 | Hapman | 198—168 |
| 2,609,081 | 9/1952 | Hapman | 198—168 |

EVON C. BLUNK, *Primary Examiner.*

RICHARD E. AEGERTER, *Examiner.*